(12) United States Patent
Shibata

(10) Patent No.: US 7,359,051 B2
(45) Date of Patent: Apr. 15, 2008

(54) MULTIPLE-WAVELENGTH SPECTROSCOPIC APPARATUS

(75) Inventor: Kohei Shibata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 5 days.

(21) Appl. No.: 11/278,037

(22) Filed: Mar. 30, 2006

(65) Prior Publication Data

US 2007/0132993 A1    Jun. 14, 2007

(30) Foreign Application Priority Data

Dec. 13, 2005    (JP) .............................. 2005-359307

(51) Int. Cl.
*G01J 3/28* (2006.01)
*G02B 27/44* (2006.01)

(52) U.S. Cl. .................. 356/328; 359/566; 398/87

(58) Field of Classification Search ............... 359/566; 356/328, 326, 334; 398/566
See application file for complete search history.

(56) References Cited

U.S. PATENT DOCUMENTS

| 5,559,597 | A  | * | 9/1996 | Battey et al. ............... 356/328 |
| 6,765,724 | B1 | * | 7/2004 | Kramer ........................ 359/566 |
| 2003/0170024 | A1 | | 9/2003 | Nishioka et al. |
| 2004/0027667 | A1 | | 2/2004 | Deutsch et al. |
| 2004/0033010 | A1 | | 2/2004 | McGuire, Jr. |

FOREIGN PATENT DOCUMENTS

| JP | 02-61529 | 3/1990 |
| JP | 2-61529 | 3/1990 |
| JP | 2001-13006 | 1/2001 |
| JP | 2004-206039 | 7/2004 |

OTHER PUBLICATIONS

Partial European Search Report, mailed Mar. 27, 2007, and issued in corresponding European Patent Application No. 06006711.3-2217.
Dan M. Marom, "Wavelength Selective 1Xk Switching Systems," IEEE, 2003, pp. 43-44.
Hendrick J. Gerritsen et al., "Rectangular surface-relief transmission gratings with a very large first-order diffraction efficiency (-95%) for unpolarized light," Applied Optics, Sep. 1, 1998, vol. 37, No. 25, pp. 5823-5829.
E. G. Loewen et al., "Efficiency optimization of rectangular groove gratings for use in the visible and IR regions," Applied Optics, vol. 18, No. 13, Jul. 1, 1979, pp. 2262-2266.
E. G. Loewen et al., "Gratings efficiency theory as it applies to blazed and holographic gratings," Applied Optics, Oct. 1977, vol. 16, No. 10, pp. 2711-2721.

* cited by examiner

*Primary Examiner*—F. L. Evans
*Assistant Examiner*—Abdullahi Nur
(74) *Attorney, Agent, or Firm*—Staas & Halsey LLP

(57) ABSTRACT

In a multi-wavelength spectroscopic apparatus using diffraction gratings, a first diffraction grating is a diffraction grating with diffraction efficiencies of p-polarized light and s-polarized light being equal on a short wavelength side of an operating wavelength range, and a second diffraction grating is a diffraction grating with diffraction efficiencies of p-polarized light and s-polarized light being equal on a long wavelength side of an operating wavelength range. By performing dispersion with two such diffraction gratings, it is possible to enlarge the amount of angular dispersion, and to produce a spectroscopic apparatus, which cancels wavelength dependencies of the diffraction efficiencies and has a small wavelength dependency of the diffraction efficiency.

11 Claims, 17 Drawing Sheets

CHARACTERISTIC OF SINGLE DIFFRACTION GRATING

CHARACTERISTIC AFTER PASSING THROUGH DIFFRACTION GRATING TWICE

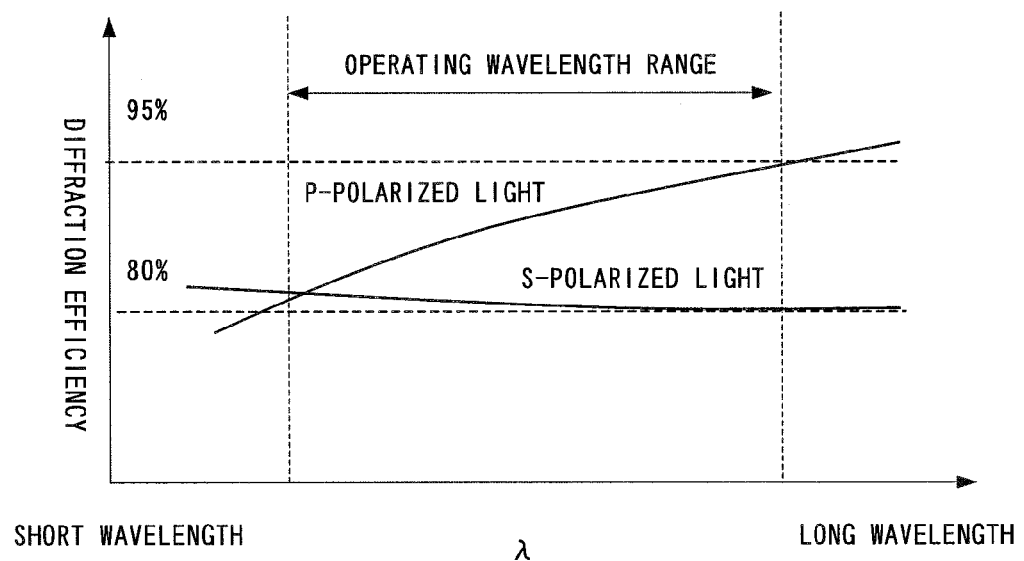
F I G. 6 A

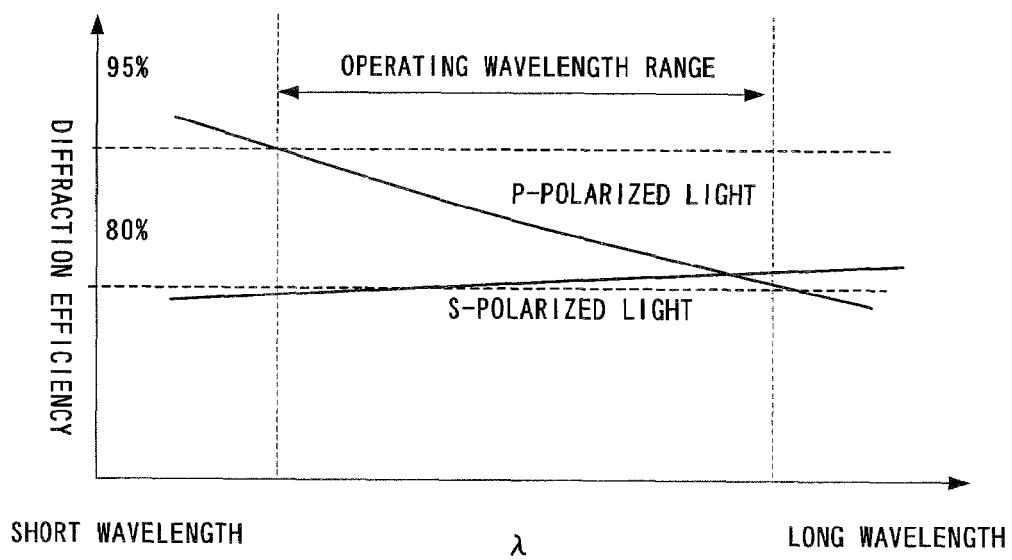
F I G. 6 B

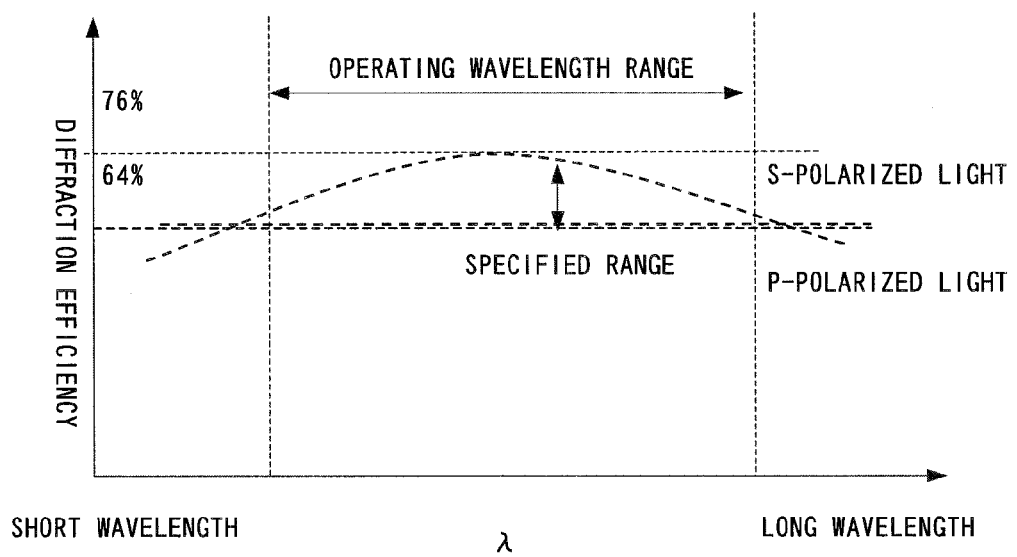
F I G. 6C

MULTIPLE-WAVELENGTH SPECTROSCOPIC APPARATUS

BACKGROUND OF THE INVENTION

1. Field of the Invention

The present invention relates to a spectroscopic apparatus, comprising a feature of handling multiple wavelengths simultaneously and in particular relates to a configuration of a spectroscopic unit, which realizes miniaturization of an optical system and attains low polarization dependency and low insertion loss over an operating wavelength range.

2. Description of the Related Art

In the past, spectroscopic apparatuses have been used for detecting monochromatic spectra etc. mainly in measurement instruments and observation equipment. However, in recent years, because of the expansion of communication capacity by multiplexing within a wavelength range and the anticipated flexibility of system operations by using differences in wavelength, a spectroscopic apparatus based on the simultaneous utilization of multiple wavelengths has been sought.

In order to apply a device comprising a spectroscopic apparatus to an optical communication system, it is crucial to achieve low insertion loss, miniaturization and low cost, in addition to low polarization dependency, as has been required in measurement instruments in the past.

In a device, which uses multiple wavelengths simultaneously, when a spectroscopic unit (apparatus) is constituted by a diffraction grating, functional elements (such as a photodiode and a deflection switch) are disposed in an array at intervals of an desired wavelength in a dispersion direction. The interval between the functional elements must be such that they are separated in accordance with the amount of angular dispersion of the diffraction grating (the size of the dispersion angle per unit wavelength), so that the wavelength interval of the light, the spectrum of which is obtained, is separated onto the array pitch of the functional elements. This distance is one of the significant factors in determining the device size, and the large amount of angular dispersion of the diffraction grating is the key to miniaturization.

On the other hand, in the spectroscopic unit, to enhance the diffraction efficiency (the ratio of the wavelength to power concentration in the dispersive direction of the wavelength) of the diffraction grating is a key to reducing the insertion loss of the device.

However, wavelength characteristics of the diffraction efficiency of p-polarized light are different from those of s-polarized light, and Polarization Dependent Loss (PDL) occurs.

In general, it is difficult to achieve large angular dispersion and high diffraction efficiency, while maintaining low polarization dependency outside a particular wavelength range. Or when a certain wavelength range is specified, it is difficult to select any angular dispersion, which provides low polarization dependency and high diffraction efficiency. For example, in a reflective diffraction grating, an angular dispersion achieved by a grating period of 600/mm for a wavelength of approximately 1550 nm, is the angular dispersion providing low polarization dependency and high diffraction efficiency.

In view of the above problem, conventionally, the following three methods have been applied or suggested.

The first method is a common method, which has been used in the past, and is described in non-Patent Document 1. In this case, the polarization dependency is ignored, and a diffraction grating parameter such that the angular dispersion and the diffraction efficiency of an operating wavelength are prioritized for one polarization state is selected. The polarization state of the light incident on the diffraction grating is spatially dispersed by an optical material (such as rutile) for dispersing polarized light, and a part of the dispersed light is matched with the other polarization state, by using a ½ wave plate. Then, by being incident on the diffraction grating, low polarization dependency, high diffraction efficiency, and high angular dispersion can be realized.

FIG. 1 is a block diagram showing a configuration of a spectroscopic apparatus of a first conventional method.

Multi-wavelength light output from a fiber and a collimator 10 is split into p-polarized light and s-polarized light by a polarization splitter/converter unit 11, and the polarization state of the one split light is converted into that of the other by a wave plate. For example, when the spectroscopic apparatus of FIG. 1 has a configuration, which operates optimally for the p-polarized light, the s-polarized light is converted to the p-polarized light by the polarization splitter/converter unit 11. In such a manner, the width of the optical beam, which passed through the polarization splitter/converter, is expanded by a prism pair 12, and is input to a condenser lens 13. The light collected by the condenser lens 13 is reflected by an MEMS mirror array 14 and is input to the resolution lens 15. The resolution lens 15, for example, irradiates a diffraction grating 16 by the p-polarized light and the light converted from the s-polarized light to the p-polarized light. The spectra of the light are obtained by the diffraction grating 16. As is clear from FIG. 1, the diffraction grating 16 has to have a large area in order to receive the two separate optical beams. Production of the diffraction grating 16 becomes more difficult and the yield becomes lower as the area increases. Thus, if a diffraction grating with a large area were to be used, the price of the whole spectroscopic apparatus would be high. The size of the spectroscopic apparatus itself would also become large, going against the current demand for a small-sized and low-priced apparatus.

FIGS. 2A-2B and FIG. 3 are diagrams explaining a second conventional method.

The second method is a method stated in Patent Document 1 and others. The angular dispersion of a first diffraction grating is ignored, and the parameters of the diffraction grating are selected so that low polarization dependency and high diffraction efficiency can be obtained at a designated wavelength. As shown in FIGS. 2A and 2B, in order to compensate for the insufficient angular dispersion, two (or an even number) of diffraction gratings are arranged so that their angular dispersions are summed. In addition, in order to prevent PDL from occurring within a wavelength range including the designated wavelength, a wave plate is provided between the diffraction gratings. The PDL is canceled out by inverting the polarization states between the two diffraction gratings. This method allows the achievement of low polarization dependency, high diffraction efficiency, and high angular dispersion.

As shown in FIG. 2A, for the purpose that the light, the spectra of which are obtained by the diffraction grating 20, is collected by the focusing optical system 21, and is properly incident on the optical receiver element or movable reflector array 22, the spatial intervals of the light collected after spectroscopic splitting have to correspond with the array intervals of the optical receiver element or movable reflector array 22. Therefore, when the angular dispersion of the diffraction grating 20 is not sufficient, the intervals between the diffraction grating 20 and the optical receiver element or movable reflector array 22 need to be longer. However, this causes the apparatus to be increased in size. Thus, as shown in FIG. 2B, large angular dispersion is acquired by using two or more diffraction gratings 20. By so doing, the interval between the diffraction grating 20 and the optical receiver element or movable reflector 22 can be reduced, enabling the whole apparatus to be kept small. Further, in the second method, a wave plate 23 is provided between the diffraction gratings 20 to reduce the polarization dependency.

FIG. 3 is a fundamental configuration diagram of the spectroscopic apparatus described in Patent Document 1. In this configuration, instead of the two diffraction gratings 20, the light passes through the diffraction grating 20 twice, gaining the angular dispersion. The spectrum of the light entering from a port 24 is obtained by the diffraction grating 20. The spectroscopically split light passes through the ¼ wave plate 23 and is reflected by the mirror 22. The light reflected by mirror 22 passes through the ¼ wave plate 23 once again. Here, the light passes through the ¼ wave plate twice, and the polarization state of the light switches from the p-polarized light to the s-polarized light or from the s-polarized light to the p-polarized light. While in the state that the polarization has been switched, the light passes through the diffraction grating a second time. Because the light passes through the diffraction grating 20 twice, the angular dispersion is doubled; however, the polarization is switched when the light passes through the diffraction grating 20 for the first time, and again the second time. When the light passes through the same diffraction grating 20 twice in the state that the polarization is switched, the polarization characteristics of the diffraction grating 20 are canceled out. In other words, assuming that a loss that occurred for light that was p-polarized the first time is a, and a loss that occurred for light that was s-polarized the second time is b, the total loss incurred by the light passing through the diffraction grating 20 twice is a+b. On the other hand, the loss incurred by the light, which was s-polarized the first time, passing through the diffraction grating 20 twice, switching the polarization each time is b+a. Therefore, an effect that both polarization components incur the same loss after the light passes through the diffraction grating 20 twice can be obtained.

FIG. 4 is a diagram explaining the third conventional method.

The third method is described in Patent Document 2 and Patent Document 3. Like the second method, the angular dispersion of one diffraction grating is ignored, and the parameters of the diffraction grating are selected so that low polarization dependency and high diffraction efficiency can be obtained at a designated wavelength. In order to compensate for the insufficient angular dispersion, two (or an even number) of diffraction gratings are arranged so that their angular dispersions are summed. At that time, the diffraction gratings are arranged so that their grooves are perpendicular to each other. Because the grooves are perpendicular to each other, incident conditions of the p-polarized light and the s-polarized light are inverted, and the same effect as the effect obtained when a wave plate is provided between the diffraction gratings can be obtained. This method allows achievement of low polarization dependency, high diffraction efficiency, and high angular dispersion (in comparison with the second method, a merit of this method is that a wave plate is not required).

In FIG. 4, the light input from an optical fiber 25 is collimated by a collimator lens 26, and the spectrum of the light is obtained by a first diffraction grating 27. The spectroscopically split light propagates to a second diffraction grating 28. The grooves of the second diffraction grating are orthogonal to the grooves of the first diffraction grating 27. The spectrum of the light is obtained in the direction orthogonal to the first diffraction grating 27 by the second diffraction grating 28. The spectroscopically split light obtained by the second diffraction grating 28 is collected onto an array element 30 by a focusing lens 29. In such a case, the angular dispersion is not simply the sum of the angular dispersions of both the first diffraction grating 27 and the second diffraction grating 28, as the angular dispersion directions of each are orthogonal to one another. Thus, the angular dispersion becomes smaller than the simple summation.

[Patent Document 1]
 U.S. Pat. No. 6,765,724

[Patent Document 2]
 Japanese Patent Application Publication No. H02-61529

[Patent Document 3]
 Japanese Patent Application Publication No. 2001-13006

[Non-patent Document 1]
 D. M. Marom "Wavelength Selective 1xK Switching System" Optical MEMS 2003 pp. 43-44

However, the above three methods have the following problems.

In the first method, due to the polarization splitter in FIG. 1, effective areas of elements after the polarization splitter including the diffraction grating have to be twice as large, and consequently the optical elements grow in size, causing an increase in cost. Specifically, if the area of the diffraction grating doubles, a degradation of the yield generally increases by more than a factor of two, and the cost generally increases by a factor of two.

FIGS. 5A-5B are diagrams showing diffraction efficiency in the second method. The second method uses diffraction gratings with the same characteristics. Therefore, when a wavelength, at which the diffraction efficiency of the p-polarized light and that of the s-polarized light are the same, does not have a characteristic, of being symmetric on either side of the center of the operating wavelength range, wavelength dependency occurs of the entire insertion loss within the operating wavelength range. Symmetric diffraction efficiency and angular dispersion characteristics, still difficult to achieve in general, can only be realized for the operating wavelength. In other words, if a diffraction grating has the characteristics of FIG. 5A, the characteristic that the s-polarization light and the p-polarization light are switched and superimposed, is shown in FIG. 5B. In this case, the diffraction efficiency still has wavelength dependency in the operating wavelength range.

The third method has problems, in addition to the problem of the second method, such as the optical arrangement inside the device being three-dimensional (the array element is tilted at 45° to the grooves of the diffraction grating), and that the entire angular dispersion is approximately $1/\sqrt{2}$ that of the second method, as shown in FIG. 4.

SUMMARY OF THE INVENTION

It is an object of the present invention to provide a multi-wavelength spectroscopic apparatus, which can be realized at low cost, and can control wavelength dependency of the whole diffraction efficiency by realizing low polarization dependency, high diffraction efficiency, and high angular dispersion, by maintaining the optical element size, and by controlling the number of components for canceling out the polarization dependency.

The multi-wavelength spectroscopic apparatus according to the present invention comprises a spectroscopic unit in which a diffraction grating with high diffraction efficiency and a diffraction grating with low diffraction efficiency for a certain wavelength within an operating wavelength range are arranged so that grooves of the diffraction gratings are approximately parallel.

According to the multi-wavelength spectroscopic apparatus of the present invention, it is possible to realize a multi-wavelength simultaneous control device, which is small in size, and comprises favorable optical characteristics (such as low polarization dependency and high diffraction efficiency), at low cost.

BRIEF DESCRIPTION OF THE DRAWINGS

FIGS. 6A-6C are diagrams explaining a first principle of an embodiment of the present invention;

BRIEF DESCRIPTION OF THE PREFERRED EMBODIMENT

The multi-wavelength spectroscopic apparatus of the embodiment of the present invention employs a plurality of diffraction gratings, in which for at least one pair of gratings there is a wavelength at which the diffraction efficiencies of p-polarized light and s-polarized light are equal and are respectively located around each end of the operating wavelength range, arranged so that the grooves of the diffraction gratings are approximately parallel, or a plurality of diffraction gratings, for which the maxima/minima of the diffraction efficiencies of p-polarized light and s-polarized light are inverted in the operating wavelength range, arranged so that the grooves of the diffraction gratings are approximately parallel.

FIGS. 6A-6C are diagrams explaining a first principle of the embodiment of the present invention.

In the examples of FIGS. 6A-6C, as shown in FIG. 6A, the first diffraction grating is a diffraction grating designed so that the diffraction efficiency of p-polarized light and s-polarized light share one equal point on the short wavelength side of the operating wavelength range, the second diffraction grating is, as shown in FIG. 6B, a diffraction grating designed so that the diffraction efficiency of p-polarized light and s-polarized light share the equal point on the long wavelength side. The diffraction efficiency for each polarization of light of each wavelength, after the light passes through both the first diffraction grating and the second diffraction grating, is the product of the first and the second diffraction efficiencies, as shown in FIG. 6C. When the maximum amount of difference between the diffraction efficiencies of the two polarizations in the first diffraction grating and in the second diffraction grating are equal, an effect, which is the same as a characteristic obtained when a wave plate is used in either diffraction grating, is obtained. As in FIG. 6C, according to the above configuration, the combined diffraction efficiency of the two diffraction gratings with respect to both s-polarized light and p-polarized light exhibits a narrow variation range so that the variation range of the diffraction efficiency falls within the specification range over the operating wavelength range. By arranging the two diffraction gratings so that the grooves are approximately parallel, the dispersion directions are approximately the same, and thus the angular dispersion of the two diffraction gratings are summed. As a result, the angular dispersion can be increased.

Figure 1:
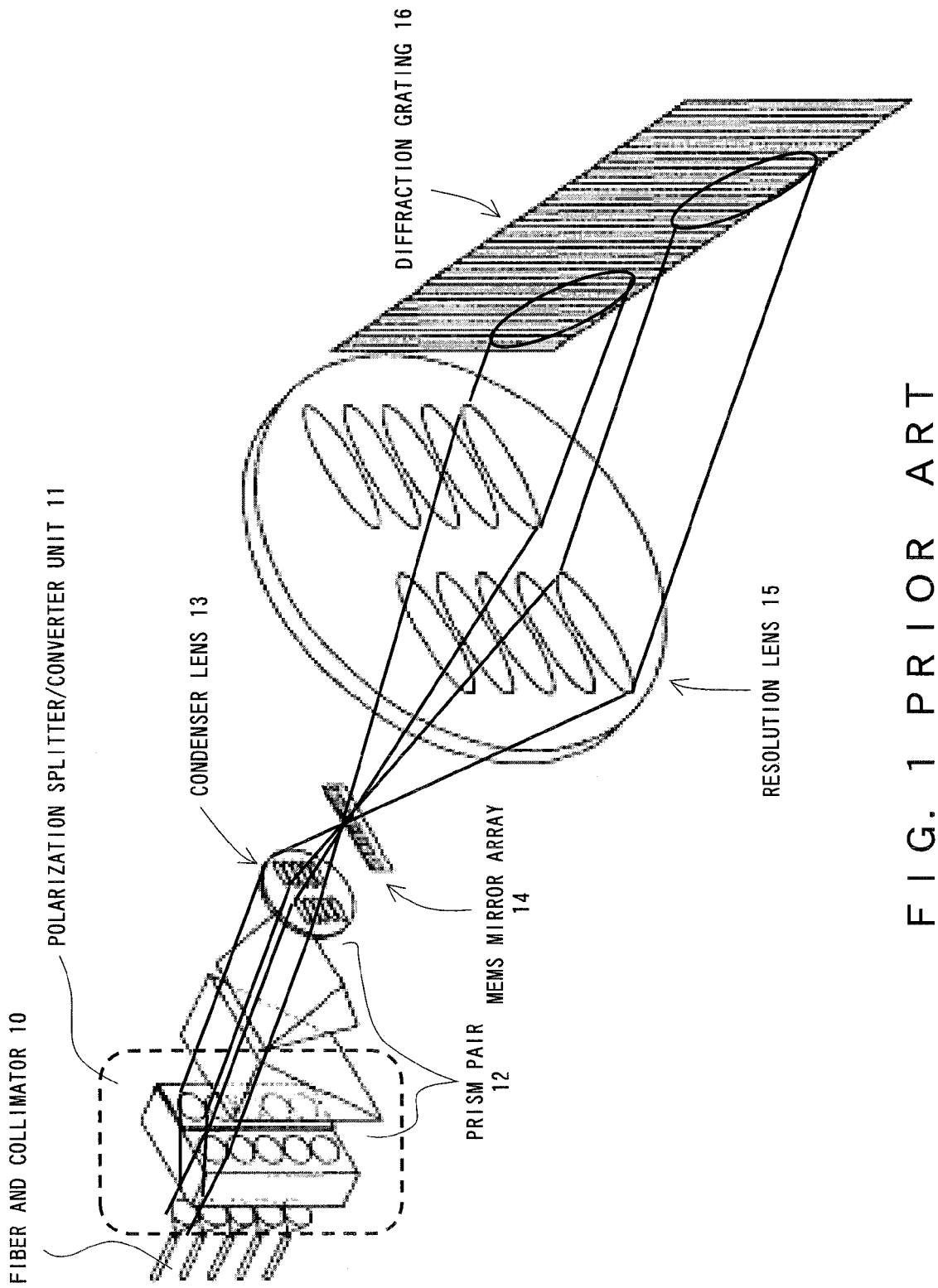
FIG. 1 is a block diagram showing a configuration of a spectroscopic apparatus of a first conventional method.
Figure 2A:
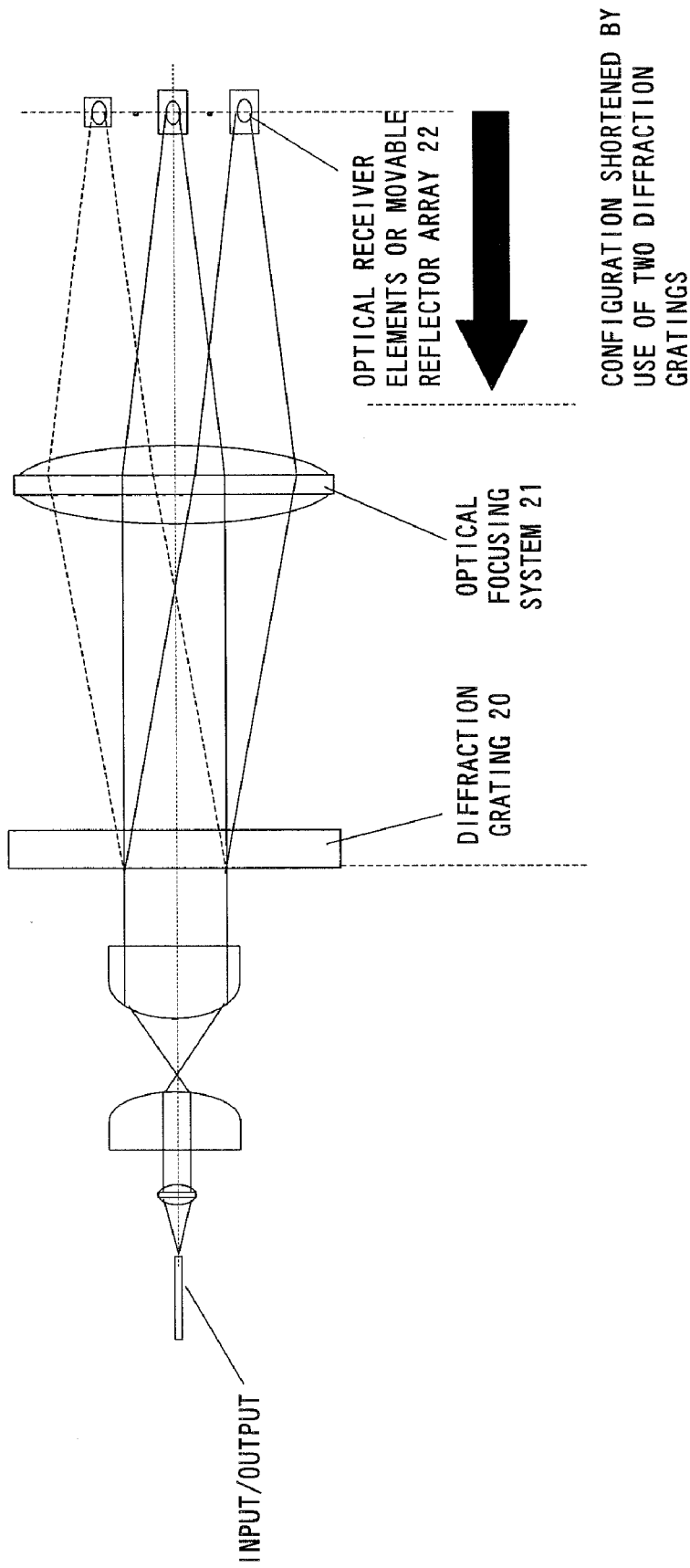
FIGS. 2A-2B are diagrams (1) explaining a second conventional method.
Figure 2B:
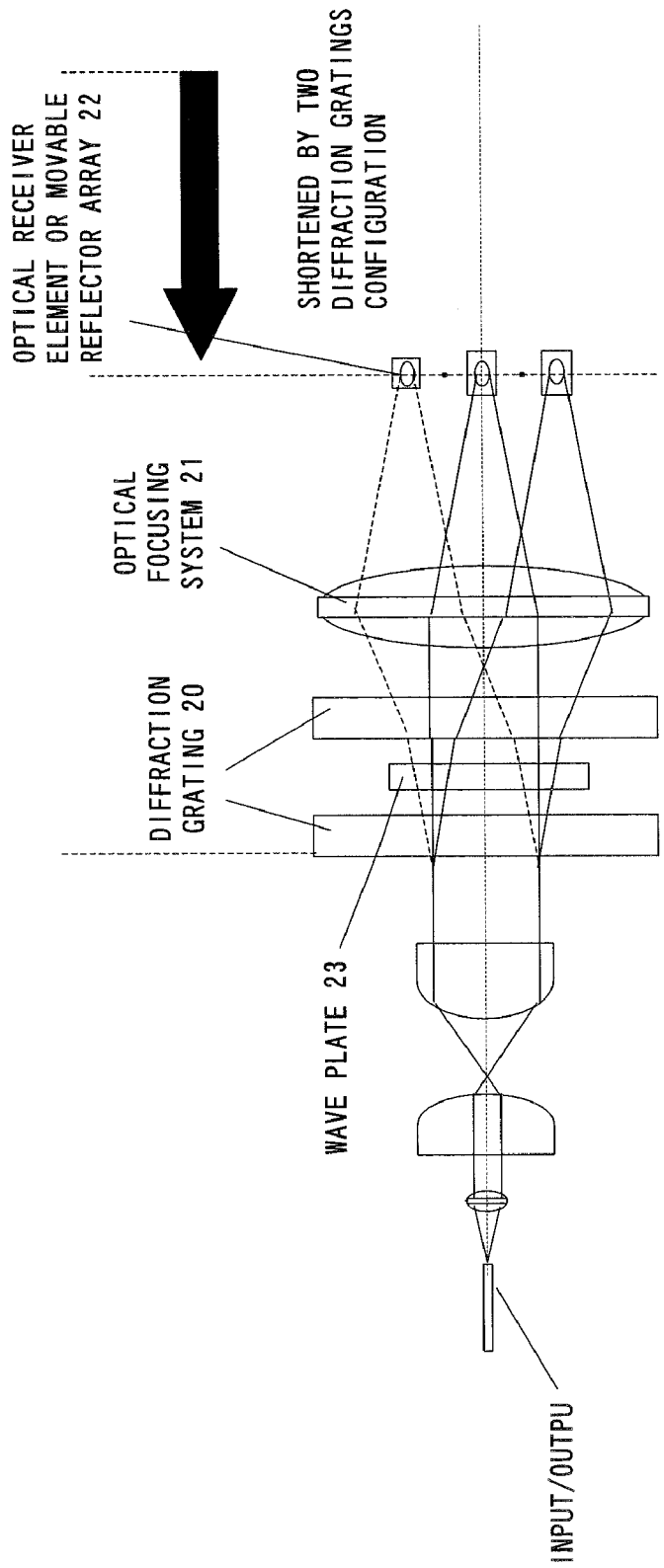
Figure 3:
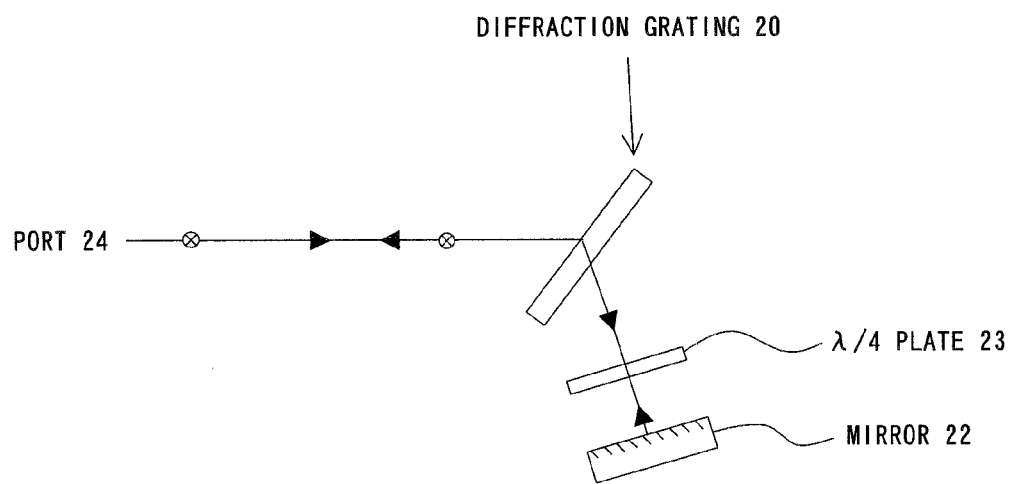
FIG. 3 is a diagram (2) explaining the second conventional method.
Figure 4:
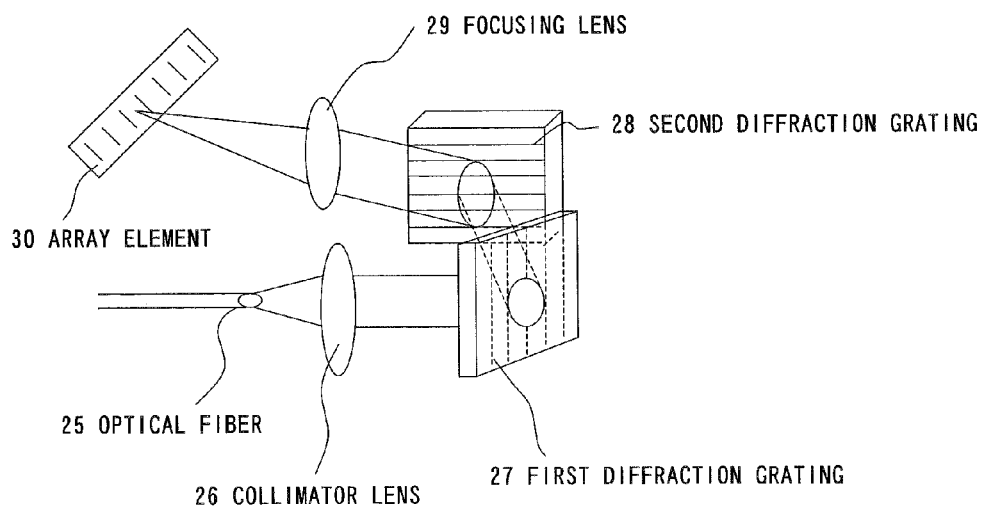
FIG. 4 is a diagram explaining a third conventional method.
Figure 5A:
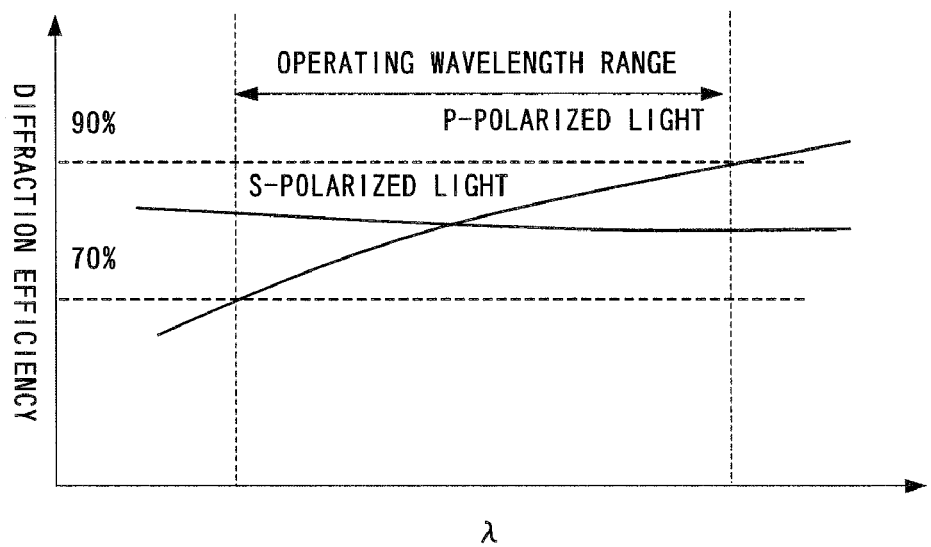
FIGS. 5A-5B are diagrams showing an overview of the diffraction efficiencies of the second method.
Figure 5B:
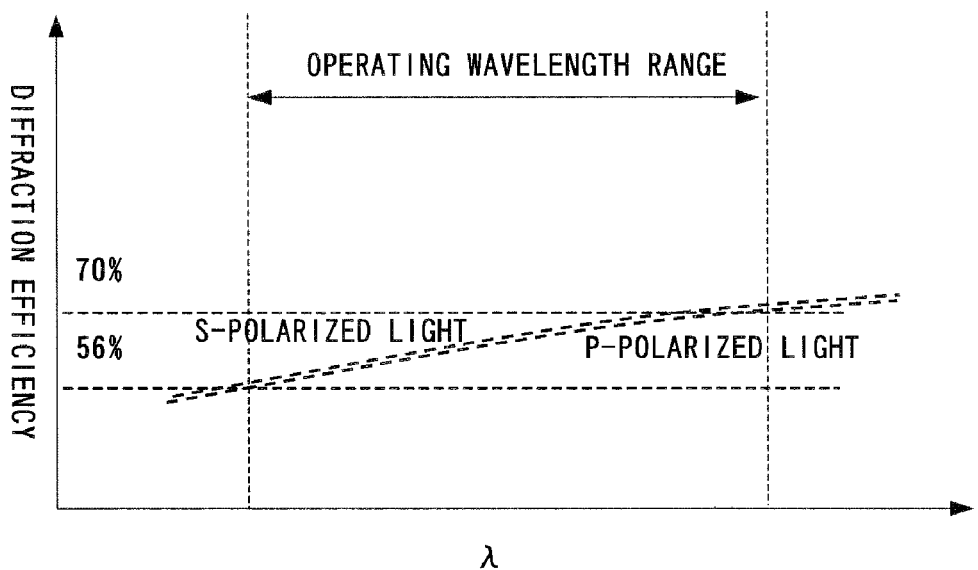
Figure 7A:
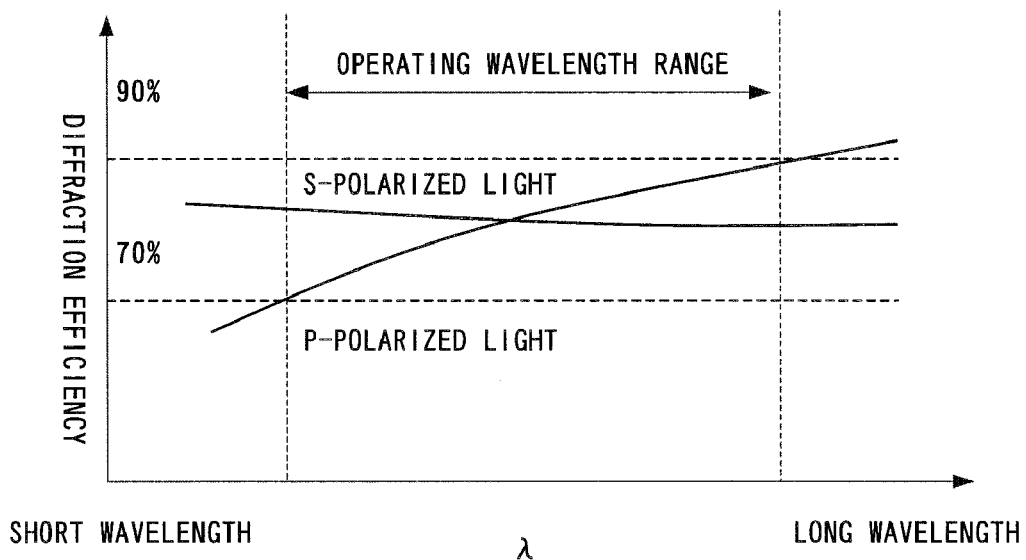
FIGS. 7A-7C are diagrams explaining a second principle of the embodiment of the present invention.
Figure 7B:
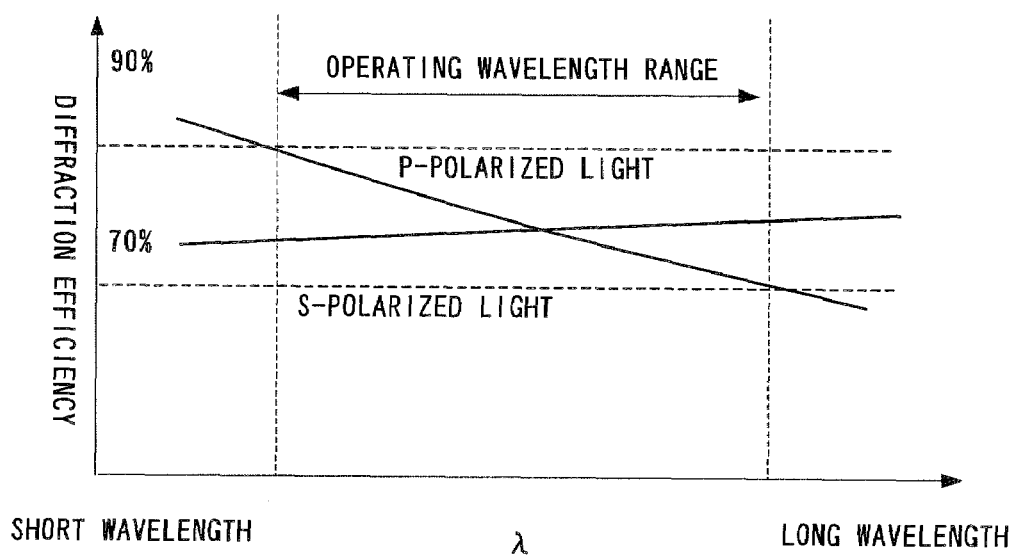
Figure 7C:
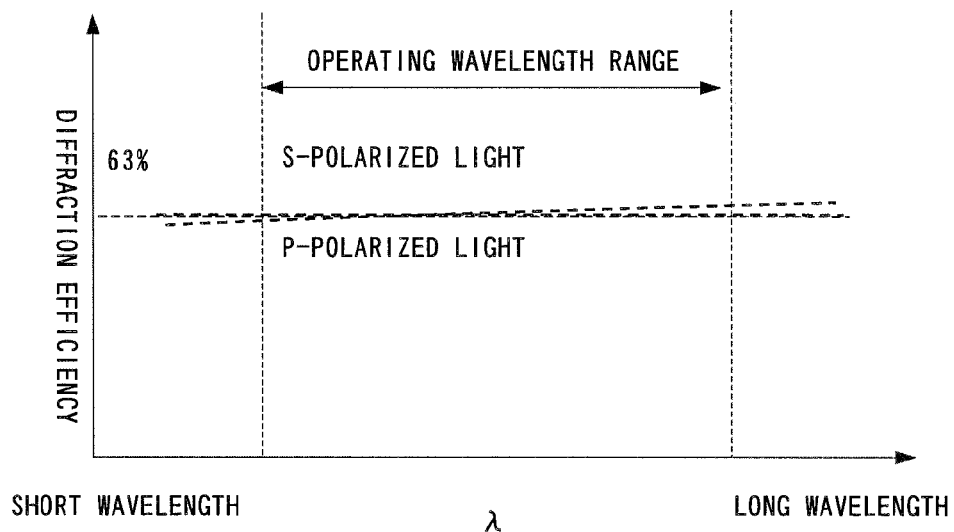

FIGS. 7A-7C are diagrams of a second principle of the embodiment of the present invention.

In the examples of FIGS. 7A-7C, the first diffraction grating of FIG. 7A and the second diffraction grating of FIG. 7B are diffraction gratings designed so that the wavelengths, at which the diffraction efficiencies of the p-polarized light and the s-polarized light are the same, are approximately the same and the diffraction efficiency of the p-polarized light (or the s-polarized light) is inverted. The diffraction efficiency of each polarization at each wavelength is the product of that of the first and the second diffraction gratings, as shown in FIG. 7c. The difference between the examples of FIGS. 6A-6C is the relative position of the wavelength where the diffraction efficiencies of the p-polarized light and the s-polarized light are equal. This indicates that when the diffraction efficiency design is limited or characteristics change due to the manufacturing tolerance has occurred, an effect of decrease in polarization dependency can be obtained, by either the configuration of FIGS. 6A-6C or that of FIG. 7A-7C, and therefore, an effect of reducing the cost to attain an intended characteristic can be also obtained.

The characteristics of the diffraction gratings used in the embodiment of the present invention can be obtained by fine adjustment of grating shape etc. of the first diffraction grating. However, the design involving the diffraction efficiency of the diffraction grating is generally not simple, thus design is performed by using simulations. Examples of design of reflecting type gratings is disclosed in Applied Optics Vol. 16, No. 10, p. 2711, Vol. 18, No. 13 p. 2262, and Vol. 37, No. 25 p. 5823 and others. Examples of design of transmission gratings are disclosed in U.S. Pat. No. 6,765,724B1, Japanese Laid-open Patent Publication No. 2004-206039 and others.

Figure 8:
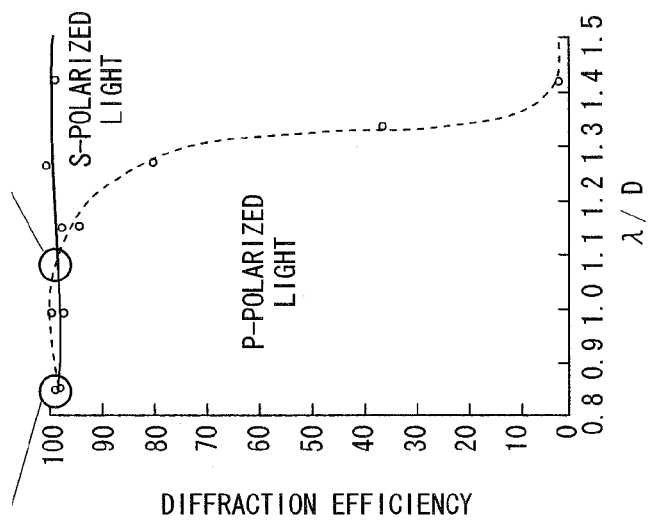
FIG. 8 is a diagram showing an example of diffraction efficiency characteristics of a diffraction grating.

FIG. 8 is a diagram showing an example of diffraction efficiency characteristics of the diffraction grating.

FIG. 8 represents the diffraction efficiency for each value of $\lambda/D$, where $\lambda$ is the operating wavelength and D is the grating period of the diffraction grating. During design, first, the operating wavelength range is set. Then, the diffraction grating is adjusted by adjusting the grating period D so that both the first and the second diffraction gratings have diffraction efficiency characteristics as in FIGS. 6A-6C and FIGS. 7A-7C within the operating wavelength range. Different grating periods in the first diffraction grating and the second one provide the characteristics shown in FIGS. 6A-6C and FIGS. 7A-7C.

In the above embodiment, a case in which two diffraction gratings are used is explained; however, three or more of the diffraction gratings can be combined. In other words, any number of diffraction gratings can be used as long as the diffraction gratings are combined so that the variations of the diffraction efficiency characteristics cancel each other out over the operating wavelength range.

The embodiment of the present invention, compared with the prior art, also has less efficiency variation over the whole operating wavelength range of the multi-wavelength spectroscopic apparatus, and furthermore, the wavelength dependency can be reduced by applying a wave plate. The configuration should comprise, when using a wave plate, an even number of diffraction gratings, and the light should pass through the diffraction gratings immediately before or after passing through the wave plate. The wave plate has the effect of switching the p-polarized light and the s-polarized light and of averaging out the characteristics of the p-polarized light and the characteristics of the s-polarized light. The wave plate is, for example, a ¼ wave plate.

Figure 9:
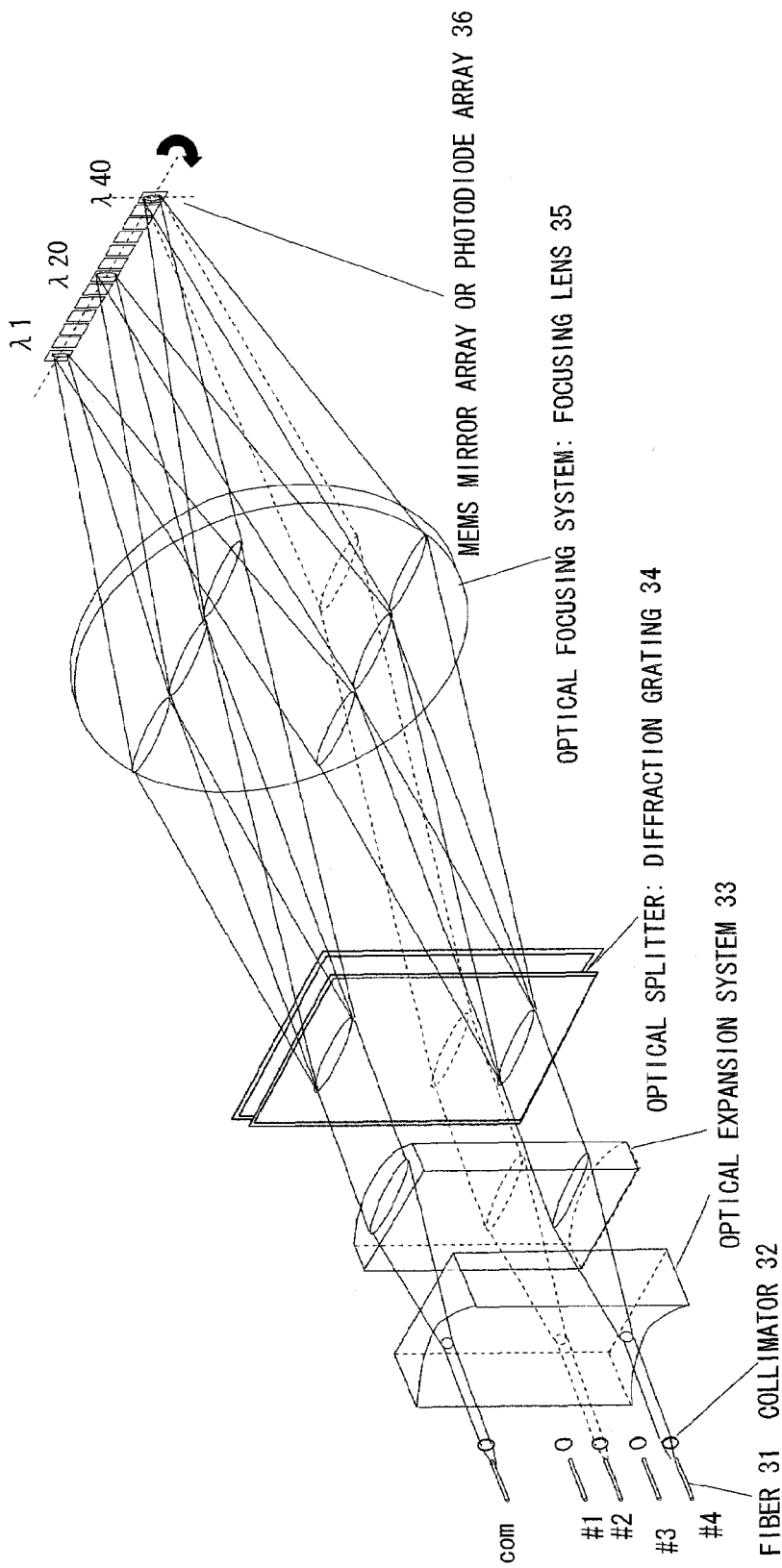
FIG. 9 is a diagram describing an example of a device using a spectroscopic apparatus according to the embodiment of the present invention.

FIG. 9 is a diagram describing an example of a device using a spectroscopic apparatus according to the embodiment of the present invention.

The device of the present configuration is referred to as a wavelength selection switch, and comprises as the smallest component, a spectroscopic unit 34 for obtaining the spectrum of a wavelength-multiplexed optical signal, input/output optical systems (an input optical system and an output optical system) with input/output ports etc. (a fiber 31, a collimator 32 and an optical expansion system 33), an optical focusing system 35, a MEMS mirror array or photodiode array 36 arranged in accordance with the wavelength. According to the embodiment of the present invention, the spectroscopic unit 34 should be composed of two or more of the diffraction gratings. An optical input from com of the fiber 31 is made a collimated light beam by the collimator 32, and its beam width is increased by the optical expansion system 33. The spectrum of the beam is obtained by the diffraction grating of the spectroscopic unit 34, and the spectroscopically split light is collected onto the elements of the MEMS mirror array or the photodiode array 36 by the focusing lens of the optical focusing system 35. When the light is collected onto the MEMS mirror array, the collected light is reflected, travels in the order of the optical focusing system 35, the spectroscopic unit 34, the optical expansion system 33, and the collimator 32, and is connected to any of the fiber 31 for output. When the light is collected onto the photodiode, the light is converted into an electrical signal by the photodiode, and is not reflected.

The spectroscopic element shown in FIG. 9 is an example of a transmissive diffraction grating, and the spectroscopic element outputs the wavelength components of the input light after diffracting each wavelength in a different direction. Each movable reflector (MEMS mirror array) is located in a position where it corresponds to a wavelength along the diffraction direction of the wavelength. By changing the angle of this movable reflector along the arrangement direction of the port, it is possible to distribute the wavelength input from the input port to any one of the output ports. In this configuration, also, a ¼ wave plate 49 maybe provided between a pair of the transmissive diffraction gratings 42. By so doing, the polarization dependency of the optical device is further reduced, producing an optical device with higher performance. The wave plate may be provided before the MEMS mirror array or photodiode 36, that is, on the side of a second deflecting mirror 45 of an aperture 48, rather than between the diffraction gratings.

Figure 10:
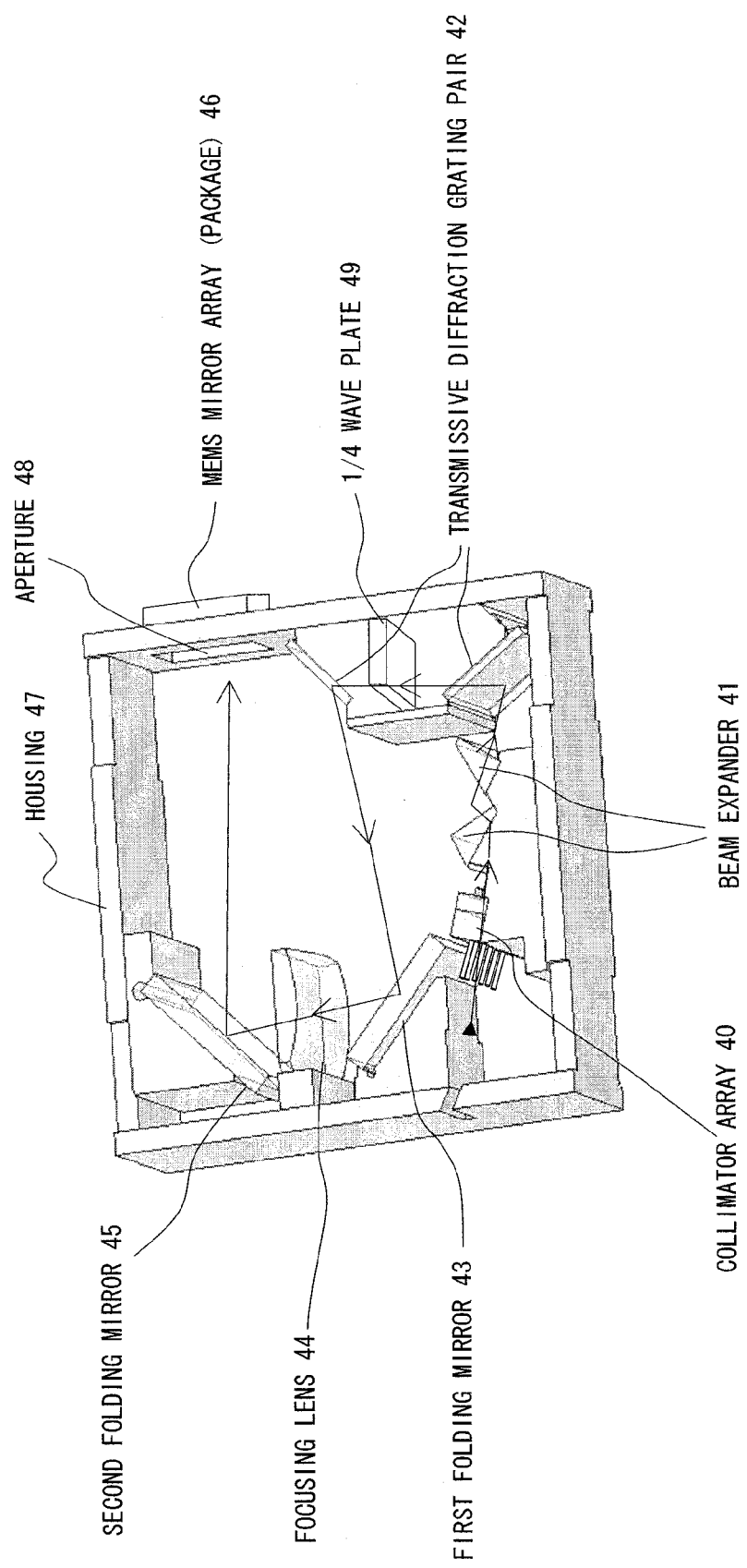
FIG. 10 is a diagram showing an example of a specific configuration of the embodiment of the present invention applied to a wavelength selection switch.

FIG. 10 is a diagram showing an example of a specific configuration when the embodiment of the present invention is applied to a wavelength selection switch.

In FIG. 10, the light travels as indicated by the arrows. First, the light enters from a collimator array 40, and passes through a beam expander (expansion optical system) 41. The beam width is expanded by the beam expander 41. Next, by passing through a pair of transmissive diffraction gratings 42, the spectrum of the light is obtained. A pair of the transmissive diffraction gratings 42 should comprise two or more of the diffraction gratings according to the embodiment of the present invention. FIG. 10 shows an example where two diffraction gratings are used. The light output of the pair of diffraction gratings 42 is reflected by a first folding mirror 43, and is incident on a focus lens 44. The propagation direction of the light collected by the focus lens 44 is changed by the second folding mirror 45, and is directed to a position where the MEMS mirror array 46 is located. The MEMS mirror array 46 is usually configured as a package, and is fixed at the aperture 48 provided in a housing 47.

The wavelength selection switch of FIG. 10, according to the embodiment of the present invention, is small in size and has favorable optical characteristics (low polarization dependency and high diffraction efficiency over a wide wavelength range).

Figure 11:
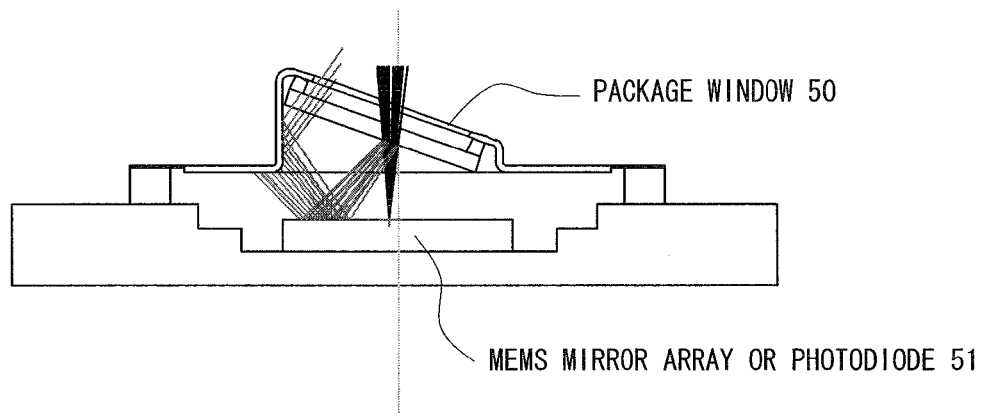
FIG. 11 is a diagram explaining the elaborated point of the optical device with application of the embodiment of the present invention.

FIG. 11 is a diagram explaining an elaborated point of an optical device with application of the embodiment of the present invention.

Considering production it is desirable that the MEMS mirror array or the photodiode array 51 is an individual package. However, in the present configuration, the optical input enters at an angle approximately perpendicular to the package window 50, and the reflection loss at the package window 50 is finite. Consequently, optical ghosting occurs in the output port.

In the present configuration, when the MEMS mirror array or the photodiode array 51 is in an individual package, as shown in FIG. 11, it is possible to prevent optical ghosting from occurring by tilting the package window 50. In other words, if the package window 50 is not tilted, the light is reflected by the package window 50, generating optical ghosting. When the package window is tilted, the light reflected by the package window 50 diverges from the optical path and the optical ghost does not reach the output port. By so doing, it is possible to improve the optical device performance using the multi-wavelength spectroscopic apparatus of the embodiment of the present invention.

In the configuration of the wavelength selection switch, also, since the light passes through the same diffraction gratings twice, the same effects can be obtained by providing a wave plate not only between the diffraction gratings but also before the movable reflector array. However, in arranging the wave plate, as explained in FIG. 11, it is favorable to tilt the wave plate as in the package window 50 in order to avoid a problem that the light reflected by the wave plate appears as an optical ghost at the output port. It should be noted that the wave plate is, for example, a ¼ wave plate.

As explained above, in the embodiment of the present invention, the spectroscopic unit has a configuration using a plurality of diffraction gratings, in which at least a pair of gratings has a wavelength at which the diffraction efficiencies of p-polarized light and s-polarized light are equal and which is located around different end of the operating wavelength range for each grating, arranged so that the grooves of the diffraction gratings are approximately parallel. Or the unit has a configuration using a plurality of diffraction gratings, in which maxima/minima of the diffraction efficiencies of p-polarized light and s-polarized light are inverted over the operating wavelength range, arranged so that the grooves of the diffraction gratings are approximately parallel. In the configuration where the diffraction gratings are present in an even number, the performance of the spectroscopic apparatus can be enhanced by placing a wave plate, which inverts p-polarized light and s-polarized light, between at least one pair of diffraction gratings. In using the spectroscopic apparatus of the embodiment of the present invention in optical communications, it is desirable to select a range, as the operating wavelength range of the diffraction grating, of the C-band 1520-1567 nm, the L-band 1567-1618 nm or a range including both the C-band and the L-band 1520-1618 nm ±10% for each range.

In addition, when configuring an optical device comprising an MEMS mirror array or a photodiode, it is favorable that the package window of the package constituting the MEMS mirror array or the photodiode is tilted with respect to the optical path. Experience shows that the angle of this tilt should be 5 degrees or more. When providing the wave plate between the diffraction grating, or before the MEMS mirror array or the photodiode, this wave plate should also be tilted. The angle of tilt of the wave plate is to be determined empirically as 5 degrees or more.

As explained above, the multi-wavelength spectroscopic apparatus of the embodiment of the present invention and the device using the apparatus is small in size, and has favorable optical characteristics (low polarization dependency and high diffraction efficiency over a wide wavelength range).

What is claimed is:

1. A multi-wavelength spectroscopic apparatus, comprising:
    a spectroscopic unit having a diffraction grating with high diffraction efficiency and a diffraction grating with low diffraction efficiency for a certain wavelength within an operating wavelength range, arranged so that grooves of the diffraction gratings are approximately parallel and so that wavelength dependency of a combination of the diffraction gratings is nearly flat.

2. The multi-wavelength spectroscopic apparatus according to claim 1, wherein
    the spectroscopic unit comprises an arrangement of a plurality of diffraction gratings each with a wavelength at which the diffraction efficiencies of p-polarized light and s-polarized light are equal being located at approximately each end of the operating wavelength range.

3. The multi-wavelength spectroscopic apparatus according to claim 1, wherein
    the spectroscopic unit comprises an arrangement of a plurality of diffraction gratings in which maxima/minima of the diffraction efficiencies of p-polarized light and s-polarized light are inverted within the operating wavelength range.

4. The multi-wavelength spectroscopic apparatus according to claim 1, comprising:
    a wave plate for inverting p-polarized light and s-polarized light between a pair of diffraction gratings.

5. The multi-wavelength spectroscopic apparatus according to claim 1, wherein the operating wavelength range is a range ±10% of any of 1520-1567 nm, 1567-1618 nm, or 1567-1618 nm.

6. An optical device, comprising:
    an optical input port;
    the multi-wavelength spectroscopic apparatus according to claim 1, spectroscopiccally splitting light from the input port;
    a focusing optical system for collecting the spectroscopically split light; and
    an optical element arranged in one dimension at approximately a focus position of the focusing optical system.

7. The optical device according to claim 6, wherein the optical element is an optical receiver element.

8. The optical device according to claim 6, wherein the optical element is a movable reflecting mirror, comprising an output port for outputting light reflected by the movable reflecting mirror.

9. The optical device according to claim 8, wherein the movable reflecting mirror is housed in a package with a window, and the window is tilted with respect to an optical path.

10. The optical device according to claim 8, wherein a ¼ wave plate, tilted with respect to an optical path, is provided between the movable reflecting mirror and the focusing optical system.

11. A multi-wavelength spectroscopic apparatus, comprising:
    a spectroscopic unit having at least two diffraction gratings with different efficiencies for a certain wavelength within an operating wavelength range, arranged so that grooves of the diffraction gratings are approximately parallel and so that wavelength dependency of a combination of the diffraction gratings is nearly flat.

* * * * *

UNITED STATES PATENT AND TRADEMARK OFFICE
CERTIFICATE OF CORRECTION

PATENT NO.         : 7,359,051 B2
APPLICATION NO.    : 11/278037
DATED              : April 15, 2008
INVENTOR(S)        : Kohei Shibata It is certified that error appears in the above-identified patent and that said Letters Patent is hereby corrected as shown below:

Column 10, Line 19, change "spectroscopoccally" to --spectroscopically--.

Signed and Sealed this

Second Day of September, 2008

JON W. DUDAS
*Director of the United States Patent and Trademark Office*